United States Patent
Harding et al.

(10) Patent No.: US 7,882,285 B2
(45) Date of Patent: Feb. 1, 2011

(54) BUFFER CACHE MANAGEMENT TO PREVENT DEADLOCKS

(75) Inventors: Matthew J. Harding, Austin, TX (US); Mitchell P. Harding, Round Rock, TX (US); Joshua D. Miers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/958,982

(22) Filed: Dec. 18, 2007

(65) Prior Publication Data

US 2009/0157969 A1 Jun. 18, 2009

(51) Int. Cl.
*G06F 12/08* (2006.01)
(52) U.S. Cl. .......................... 710/56; 711/118; 711/171
(58) Field of Classification Search .................. None
See application file for complete search history.

(56) References Cited

U.S. PATENT DOCUMENTS 6,944,711 B2 * 9/2005 Mogi et al. ................. 711/113
7,143,263 B2 * 11/2006 Anand et al. ................ 711/171
7,480,750 B2 * 1/2009 Shimizu ....................... 710/56

* cited by examiner

*Primary Examiner*—Gary J Portka
(74) *Attorney, Agent, or Firm*—Dillon & Yudell LLP

(57) ABSTRACT

A method, computer program product, and data processing system for managing a input/output buffer cache for prevention of deadlocks are disclosed. In a preferred embodiment, automatic buffer cache resizing is performed whenever the number of free buffers in the buffer cache diminishes to below a pre-defined threshold. This resizing adds a pre-defined number of additional buffers to the buffer cache, up to a pre-defined absolute maximum buffer cache size. To prevent deadlocks, an absolute minimum number of free buffers are reserved to ensure that sufficient free buffers for performing a buffer cache resize are always available. In the event that the buffer cache becomes congested and cannot be resized further, threads whose buffer demands cannot be immediately satisfied are blocked until sufficient free buffers become available.

20 Claims, 5 Drawing Sheets

BUFFER CACHE MANAGEMENT TO PREVENT DEADLOCKS

BACKGROUND OF THE INVENTION

1. Technical Field

The present invention relates generally to input/output management in a computer operating system. In particular, the present invention is directed to a method, computer program product, and data processing system for managing operating system buffer caches for input/output devices.

2. Description of the Related Art

In a computer system, input/output (I/O) to/from peripheral devices (especially secondary storage devices such as disks or other media) is typically slower than memory. In particular, magnetic and optical storage devices such as disks or tapes generally require that the read/write head be physically positioned over the portion of the medium to be read/written, which takes time to accomplish. In the case of a rotating disk written in concentric tracks, there is a seek time associated with moving the read/write head to the desired track as well as a latency involved in rotating the disk to the desired portion of the track to be read/written. Moreover, since disks and other storage media are typically designed to read and write blocks of data, rather than individual bytes or characters, a series of reads and writes could require multiple subsequent accesses of the same block or sector. If the block must be positioned under the read/write head each time, this can cause serious performance degradation as the disk must perform the same relatively slow mechanical operations over and over.

One of the most common methods of addressing this performance problem is to use a "buffer cache," sometimes also referred to as a "block cache." A buffer cache is a collection of memory buffers that act as temporary storage locations for data moving to or from an I/O device. Application software performing I/O operations read and write data to/from the buffer cache, which is relayed to/from the I/O device by the operating system as needed.

In a typical system, a limited amount of memory space is allocated for the buffer cache. Under heavy I/O loads, this space may fill up quickly, causing processes or threads that need buffer space to hang. Some operating systems, such as AIX (Advanced Interactive executive), a product of International Business Machines Corporation, provide administrative users the ability to manually resize a buffer cache. AIX, for example, provides the "chdev" utility program, which can perform this function. Under very heavy I/O loading, however, even administrator intervention may be ineffective, since a utility program such as "chdev" will generally need its own buffers allocated in the buffer cache to perform its function. This may ultimately lead to a deadlock condition, thus necessitating a reboot of the system.

What is needed, therefore, is method of preventing an exhausted buffer cache from creating a deadlock situation. The present invention provides a solution to this and other problems, and offers other advantages over previous solutions.

SUMMARY OF THE INVENTION

Accordingly, the present invention provides a method, computer program product, and data processing system for managing a input/output buffer cache for prevention of deadlocks. In a preferred embodiment, automatic buffer cache resizing is performed whenever the number of free buffers in the buffer cache diminishes to below a pre-defined threshold. This resizing adds a pre-defined number of additional buffers to the buffer cache, up to a pre-defined absolute maximum buffer cache size. To prevent deadlocks, an absolute minimum number of free buffers are reserved to ensure that sufficient free buffers for performing a buffer cache resize are always available. In the event that the buffer cache becomes congested and cannot be resized further, threads whose buffer demands cannot be immediately satisfied are blocked until sufficient free buffers become available. A record of each blocked thread is placed in a priority queue so that the blocked thread with the smallest buffer requirements is placed at the front of the queue. Threads are unblocked and removed from the head of the priority queue as sufficient buffers become available. This ensures that the system as a whole continues to make progress, even in the event of extreme buffer congestion.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
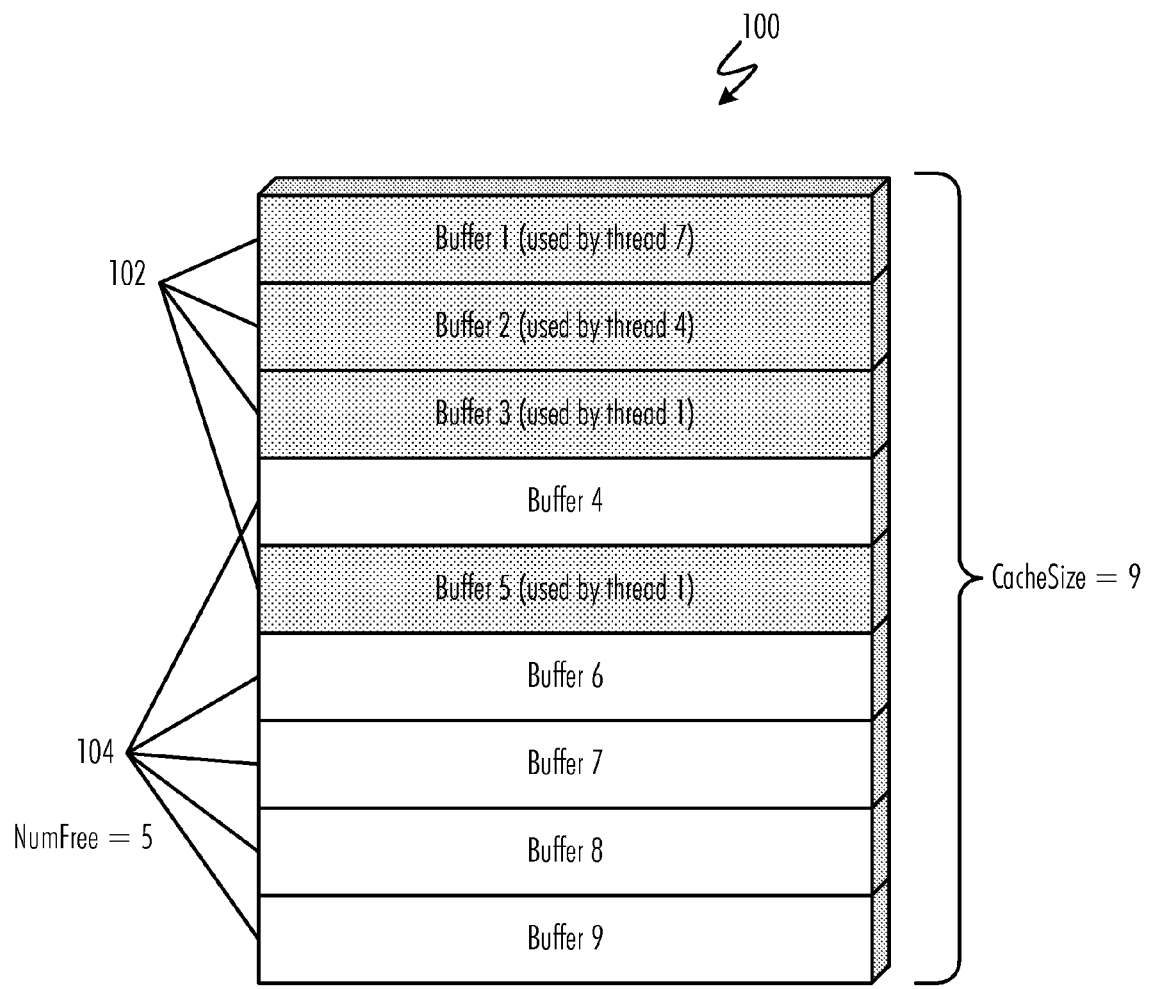
FIG. 1 is a diagram of a buffer cache as may be managed by a preferred embodiment of the present invention.

FIG. 1 is a diagram of a buffer cache as may be managed by a preferred embodiment of the present invention. Buffer cache 100 is a region of memory subdivided into a number of uniformly-sized buffers (e.g., buffers 102 and buffers 104), which are temporary storage locations for data being moved to or from an input/output (I/O) device, such as a disk or a network adapter, or a plurality of I/O devices. Since a preferred embodiment of the present invention is implemented in the context of a multithreaded operating system or other multithreaded runtime environment, buffers are allocated to various concurrently-executing threads as needed for those threads to perform I/O. (Here, the term "thread" is used in an inclusive sense to refer to single-thread processes as well as individual threads in multithreaded processes.) Several allocated buffers 102 are depicted in FIG. 1 as being allocated to various threads. The remaining buffers that have not been allocated to threads are referred to as "free buffers" 104. In the example provided in FIG. 1, there are a total of nine buffers in buffer cache 100, of which four (buffers 102) are allocated to processes and five (buffers 104) are free. To assign variable names to these counts for convenience, we will say that "CacheSize" (the total number of buffers in buffer cache 100) is "9" and that "NumFree" (the current number of free buffers in buffer cache 100) is "5."

A preferred embodiment of the present invention attempts to avoid buffer cache congestion by automatically enlarging buffer cache 100 whenever NumFree becomes too low (i.e., the cache becomes sufficiently congested). Specifically, whenever NumFree becomes less than a user-defined threshold we will call "DangerLevel," a preferred embodiment of the present invention attempts to enlarge buffer cache 100 by adding an additional user-defined number of available buffers to buffer cache 100. This user-defined number is referred to herein as "GrowthAmt." Thus, if NumFree falls below DangerLevel, an attempt to increase CacheSize by GrowthAmt is made.

In a preferred embodiment, such attempts to increase CacheSize are subject to a user-defined absolute maximum total buffer cache size, referred to herein as "MaxCacheSize." CacheSize may not be increased to larger than MaxCacheSize. Once MaxCacheSize has been reached and congestion can no longer be avoided by adding more buffers to buffer cache 100, a preferred embodiment of the present invention uses a prioritization scheme to ensure that whenever a thread's buffer requirements can be met, buffers will be allocated and computational progress will be maintained.

Specifically, in a preferred embodiment of the present invention, a minimum number of free buffers, "MinFree," is defined. This MinFree number is at least as large as the minimum number of free buffers needed to perform a buffer cache enlargement. If satisfying a thread's buffer requirement would cause NumFree to fall below MinFree, that thread is blocked (i.e., its execution is suspended) until the thread's requirements can be met without causing NumFree to fall below MinFree. This achieves two purposes: First, it ensures that a buffer cache enlargement will not fail to occur due to an exhausted buffer cache. Second, it allows for an orderly and efficient allocation of buffers as they become available.

Figure 2:
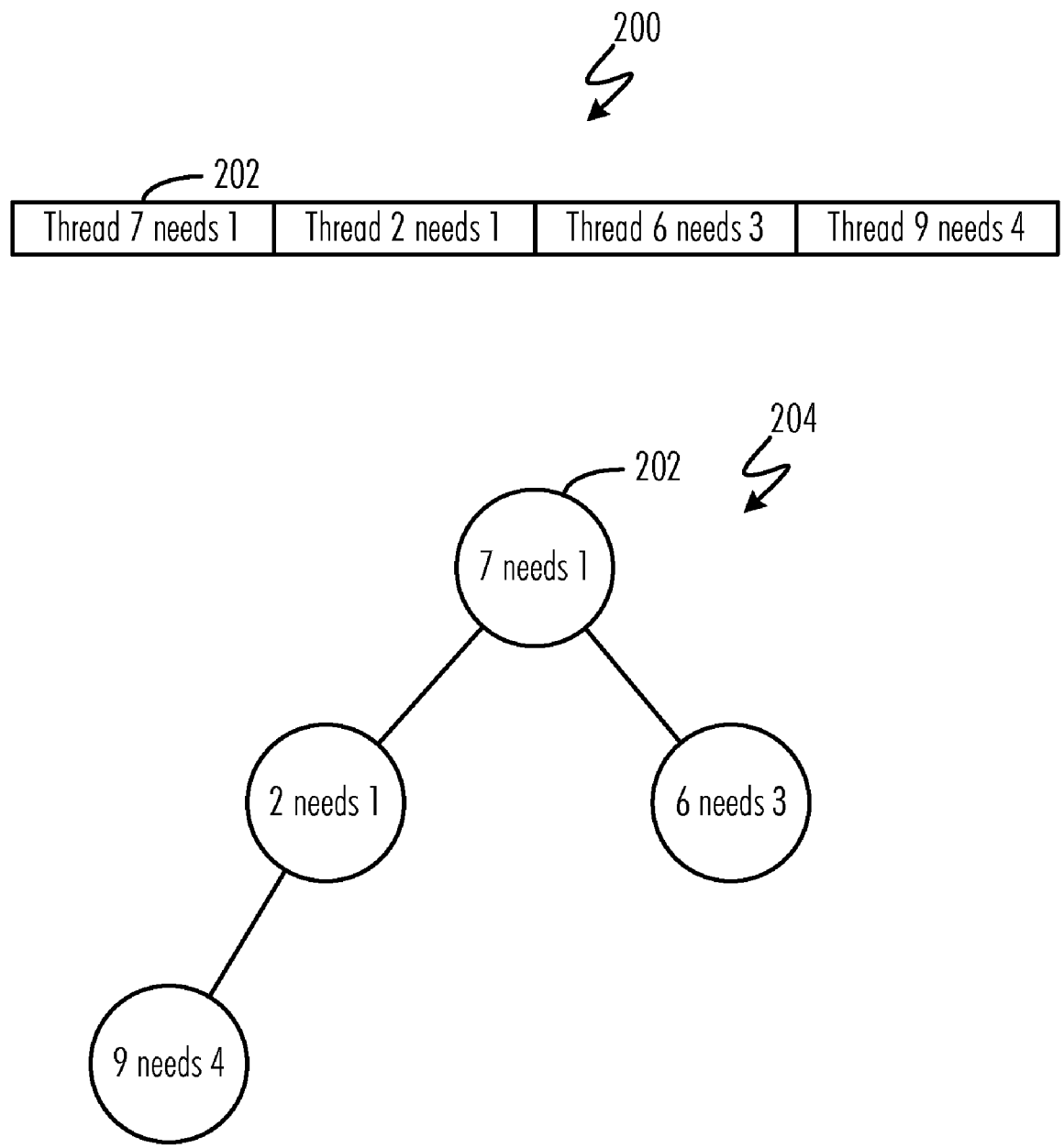
FIG. 2 is a diagram of a priority queue used for recording blocked threads in a preferred embodiment of the present invention.

With regard to this second purpose, a preferred embodiment of the present invention makes use of a priority queue to facilitate the orderly reactivation of and allocation of buffers to blocked threads. FIG. 2 is a diagram illustrating such a priority queue. In accordance with this preferred embodiment, whenever a thread is blocked because of buffer congestion, a record of that thread is placed on priority queue 200. Priority queue 200 is arranged so that the thread appearing at the head of priority queue 200 (head 202) always has the least buffer requirements of any other blocked thread (i.e., head 202 represents the thread requiring the fewest number of additional buffers). As in the example provided in FIG. 2, since "Thread 7" only requires 1 buffer to be allocated to it, "Thread 7" resides at the head (202) of priority queue 200, ahead of other threads having requirements no less than that of "Thread 7." In this preferred embodiment, threads are reactivated and allocated buffers in the order they appear in priority queue 200 as they are removed from priority queue 200, so that the thread at the head of the queue (head 202) is always the next thread to be reactivated. Whenever free buffers become available (e.g., because they have been released by the threads to which they were allocated or because the buffer cache has been enlarged), an attempt is made to reactivate blocked threads from the priority queue. This process is described in flowchart form in FIG. 4.

As a practical matter, priority queue 200 may be represented in memory using a min-heap data structure 204, as also shown in FIG. 2. A min-heap is a tree data structure in which each child node's value (in this case, number of buffers needed) is no less than the node's parent node, so that the root node of the tree is never greater than any other node in the heap (thus making it the minimum-value node). Heaps, their creation, heap element insertion and deletion, and the use of heaps as priority queues are described in detail in Chapter 6 of Cormen, Leiserson, Rivest, and Stein, *Introduction to Algorithms*, Second Edition, MIT Press, 2001, ISBN 0-262-03293-7, pp. 127-144, which is incorporated herein by reference.

Figure 3:
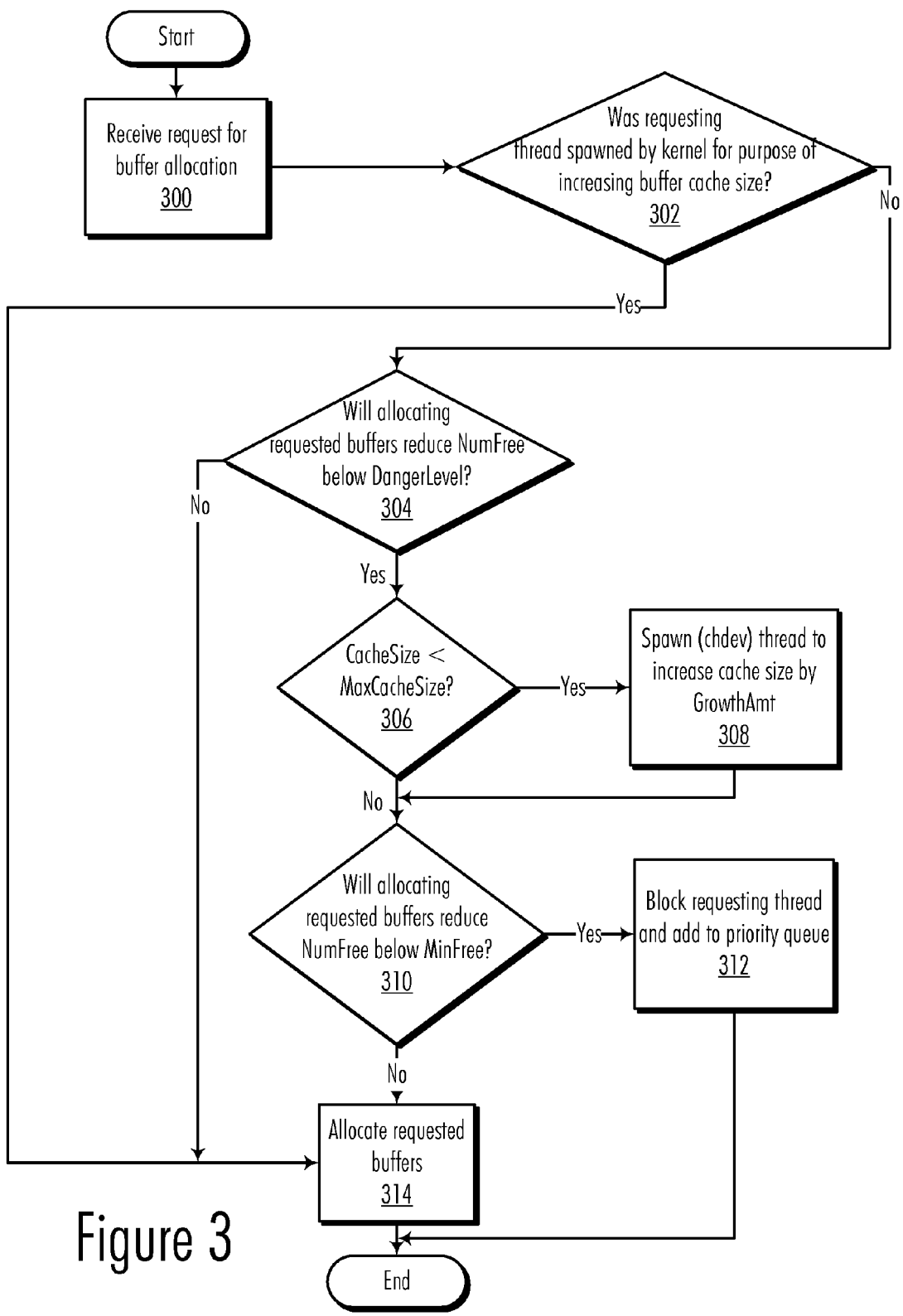
FIG. 3 is a flowchart representation of a process of responding to the I/O buffer requirements of threads in accordance with a preferred embodiment of the present invention.

In a preferred embodiment of the present invention, where a buffer cache is being managed by an operating system kernel, each time a thread requests additional buffers, the kernel must determine how to respond to this need so as to prevent deadlocks in the manner described above. FIG. 3 is a flowchart representation of a process of responding to the I/O buffer requirements of threads in accordance with a preferred embodiment of the present invention. When a thread requests an allocation of one or more buffers (block 300), the kernel first determines whether the thread requesting the buffers was in fact spawned by the kernel itself for the purpose of increasing the size of the buffer cache (block 302). Because the kernel reserves a minimum number of free buffers to allow a buffer cache resize at any time, the thread that performs the resizing must be allowed to use those reserved buffers, even though other threads are not permitted to use the reserved buffers. Hence, if the requesting thread is the buffer cache resizing thread (block 302:Yes), the requested buffers are simply allocated (block 314) and normal kernel processing continues thereafter (i.e., the procedure depicted in FIG. 3 ends and the kernel continues on with other tasks).

In the case of any other thread, however, (block 302:No), execution proceeds to block 304, where a determination is made as to whether allocating the requested buffers will reduce NumFree to below DangerLevel (i.e., whether the number of free buffers will be reduced to below the user-defined DangerLevel threshold). If NumFree will remain above DangerLevel even after the requested allocation (block 304:No), then the requested buffers are allocated (block 314) and normal kernel processing continues.

If the requested allocation will make NumFree fall below DangerLevel (block 304:Yes), then it is determined whether CacheSize is less than MaxCacheSize (i.e., whether additional buffers could be added to the buffer cache to make it larger) (block 306). If so (block 306:Yes), then the kernel spawns an additional thread (the "chdev" utility, in the case of AIX) to increase the size of the buffer cache by the pre-specified GrowthAmt (block 308).

Next, a determination is made as to whether allocating the requested buffers would reduce NumFree to below MinFree (thus preventing the buffer cache enlargement thread from having the minimum number of buffers needed to execute) (block 310). If so (block 310:Yes), then the requesting thread is blocked and a record of the thread's request is placed in the priority queue for future reactivation (block 312), with normal kernel processing continuing thereafter. Otherwise (block 310:No), the requested buffers are allocated (block 314), with normal kernel processing continuing thereafter.

Figure 4:
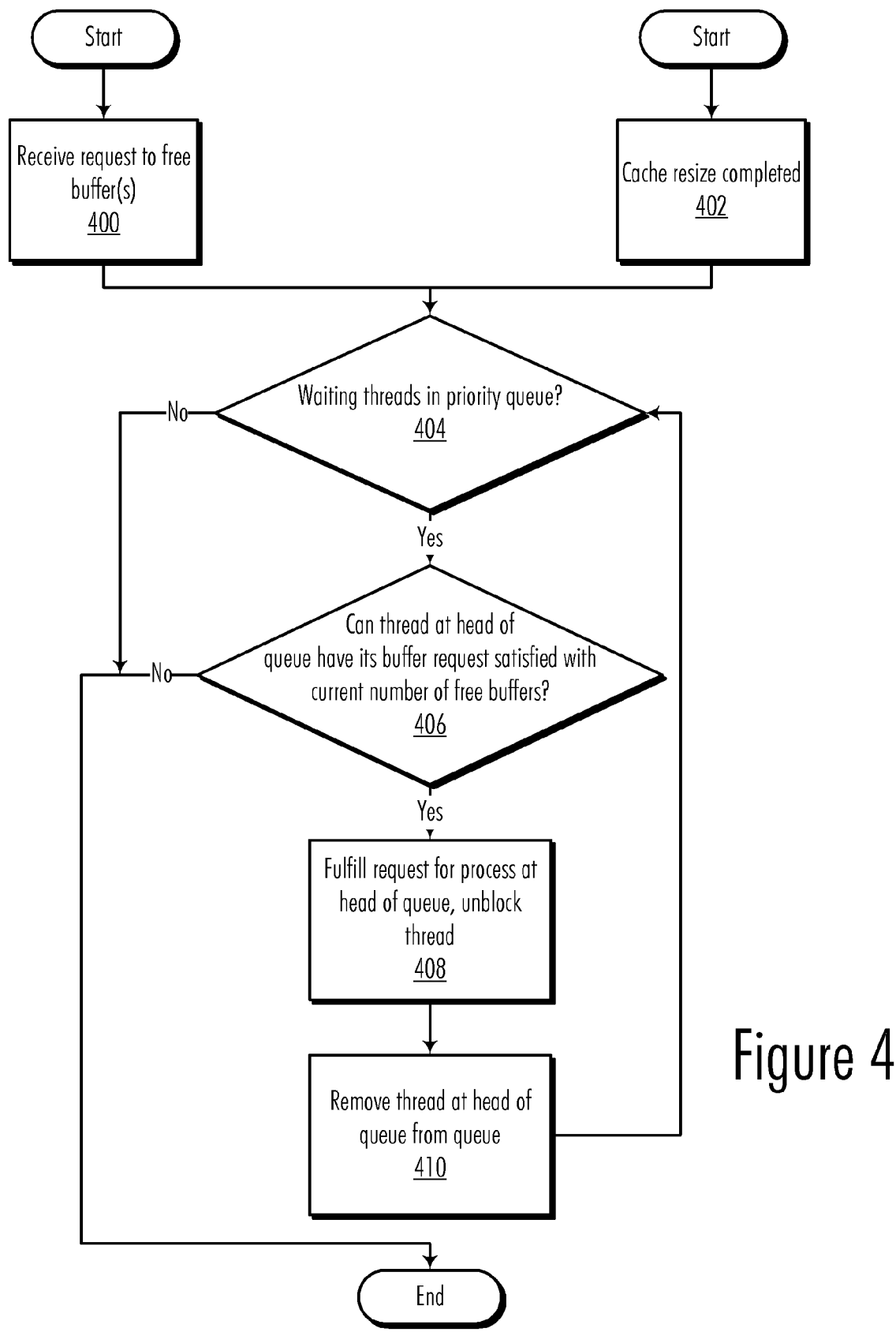
FIG. 4 is a flowchart representation of a process of unblocking threads in response to an increase in free buffers in accordance with a preferred embodiment of the present invention.

Blocked threads are resumed/reactivated through the process depicted in FIG. 4. FIG. 4 is a flowchart representation of a process of unblocking threads in response to an increase in free buffers in accordance with a preferred embodiment of the present invention. As stated above, there are two situations in which the process described in FIG. 4 may arise (and hence, two starting points in the flowchart). An increase in free buffers may arise when the kernel is requested to free buffers previously allocated to a thread (block 400) or after a successfully completed buffer cache enlargement (block 402). While there are blocked threads in the priority queue (block 404:Yes) and the thread at the head of the queue can have its buffer request fulfilled without NumFree falling below MinFree (block 406:Yes), the kernel allocates the requested buffers for the thread at the head of the queue and reactivates (resumes) the thread (block 408). The reactivated thread is then removed from the queue (block 410), and the process loops back to block 404 to continue until there are either no blocked threads in the queue (block 404:No) or the thread at the head of the queue cannot have its buffer needs satisfied without NumFree falling below MinFree (block 406:No).

Although FIGS. 3 and 4 illustrate the application of the present invention in the context of an operating system kernel, one skilled in the art will recognize that the buffer cache management scheme described herein may be applied in other contexts as well. For example, many database management systems maintain their own buffer caches as well as manage a plurality of concurrent threads and therefore might be configured to apply the methods described herein. Other application software packages and system software packages that must manage a buffer space may also benefit from the techniques described herein.

Figure 5:
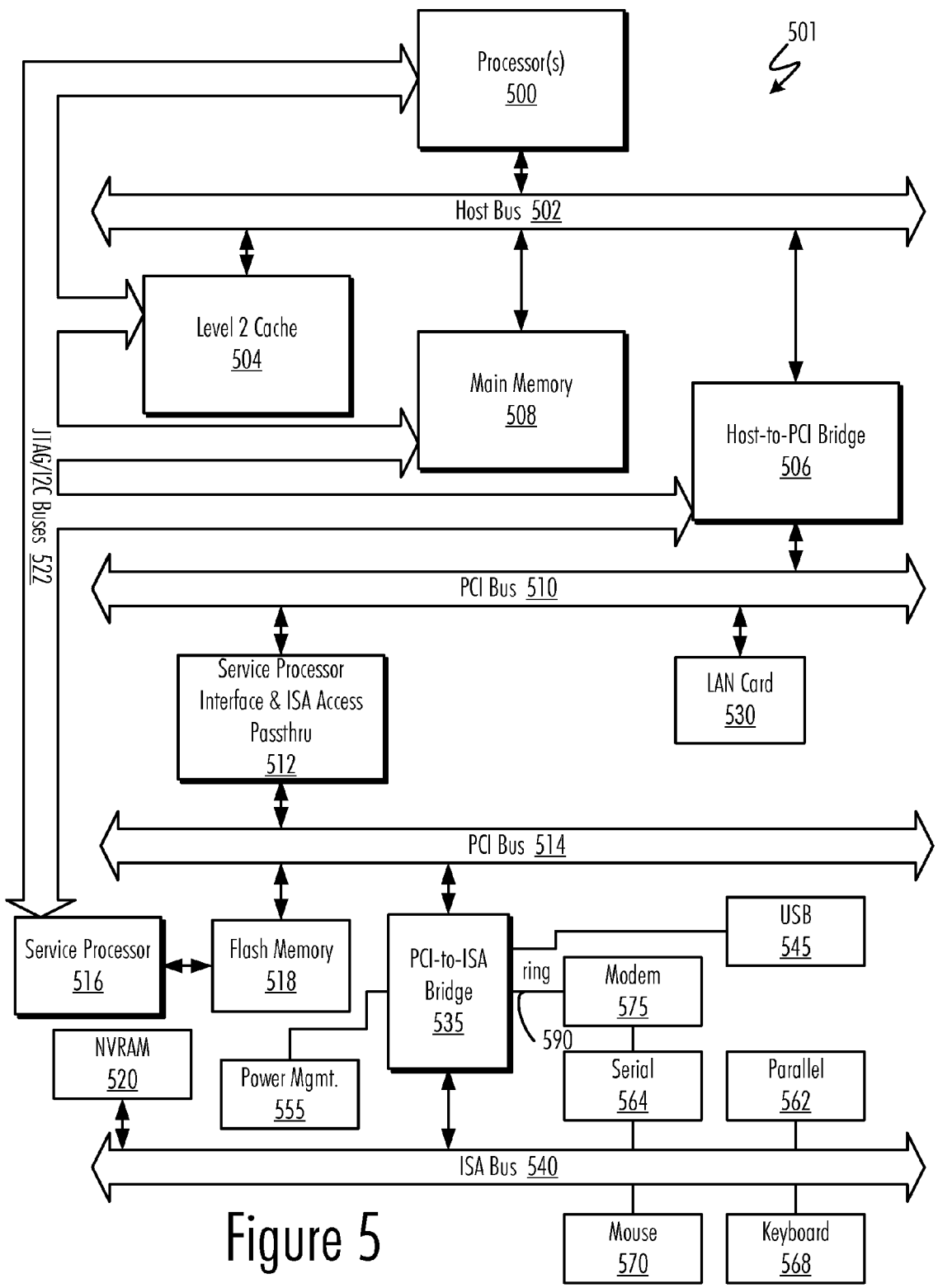
FIG. 5 is a data processing system in which a preferred embodiment of the present invention may be implemented.

FIG. 5 illustrates information handling system 501 which is a simplified example of a computer system/data processing system capable of performing the computing operations described herein with respect to a preferred embodiment of the present invention. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C buses 522 for communication with processor(s) 500 during initialization steps. JTAG/I2C buses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540). Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a computer program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-performed method of managing a buffer cache, comprising:
   determining that a thread executing in a computer requires an allocation of one or more input/output buffers in a buffer cache residing in memory of the computer;
   determining if performing the allocation would result in the buffer cache having a number of free buffers that is less than a pre-determined threshold;
   in response to a determination that performing the allocation would result in the buffer cache having a number of free buffers that is less than the pre-determined threshold, increasing a total size of the buffer cache; and
   in response to a determination that performing the allocation would not result in the buffer cache having a number of free buffers that is less than the pre-determined threshold:
      determining if performing the allocation would result in the buffer cache having a number of free buffers that is less than a minimum number of buffers needed to perform the action of increasing the total size of the buffer cache, wherein the predetermined threshold is at least as big as the minimum number;
      in response to a determination that performing the allocation would result in the buffer cache having a number of free buffers that is less than the minimum number of buffers needed to perform the action of increasing the total size of the buffer cache, blocking the thread until the allocation can be performed without the buffer cache having fewer than the minimum number of buffers needed to perform the action of increasing the total size of the buffer cache; and
      in response to a determination that performing the allocation would not result in the buffer cache having a number of free buffers that is less than the minimum number of buffers needed to perform the action of increasing the total size of the buffer cache, performing the allocation.

2. The method of claim 1, wherein said increasing the total size of the buffer cache includes spawning an additional process, wherein the additional process increases the size of the buffer cache.

3. The method of claim 1, wherein the pre-determined threshold is user-definable.

4. The method of claim 1, wherein said increasing the total size of the buffer cache includes increasing the total size of the buffer cache by a user-definable number of additional buffers.

5. The method of claim 1, wherein blocking the thread includes:
   placing a record of the thread in a priority queue, wherein the priority queue is ordered such that threads requiring fewer additional buffers are associated with records that are closer to a head of the priority queue.

6. The method of claim 5, further comprising:
   determining if sufficient free buffers exist in the buffer cache to allocate buffers required by a lowest-requirement thread associated with a record at the head of the priority queue; and in response to a determination that sufficient free buffers exist in the buffer cache to allocate the buffers required by the lowest-requirement thread, allocating the buffers required by the lowest-requirement thread.

7. The method of claim 1, wherein the method is performed in an operating system kernel.

8. A computer program product in one or more tangible computer-readable media of computer code, comprising functional descriptive material that, when executed by a computer, causes the computer to perform actions of:
   determining that a thread executing in the computer requires an allocation of one or more input/output buffers in a buffer cache residing in memory of the computer;
   determining if performing the allocation would result in the buffer cache having a number of free buffers that is less than a pre-determined threshold;
   in response to a determination that performing the allocation would result in the buffer cache having a number of free buffers that is less than the pre-determined threshold, increasing a total size of the buffer cache; and
   in response to a determination that performing the allocation would not result in the buffer cache having a number of free buffers that is less than the pre-determined threshold:
      determining if performing the allocation would result in the buffer cache having a number of free buffers that is less than a minimum number of buffers needed to perform the action of increasing the total size of the buffer cache, wherein the predetermined threshold is at least as big as the minimum number;
      in response to a determination that performing the allocation would result in the buffer cache having a number of free buffers that is less than the minimum number of buffers needed to perform the action of increasing the total size of the buffer cache, blocking the thread until the allocation can be performed without the buffer cache having fewer than the minimum number of buffers needed to perform the action of increasing the total size of the buffer cache; and
      in response to a determination that performing the allocation would not result in the buffer cache having a number of free buffers that is less than the minimum number of buffers needed to perform the action of increasing the total size of the buffer cache, performing the allocation.

9. The computer program product of claim 8, wherein said increasing the total size of the buffer cache includes spawning an additional process, wherein the additional process increases the size of the buffer cache.

10. The computer program product of claim 8, wherein the pre-determined threshold is user-definable.

11. The computer program product of claim 8, wherein said increasing the total size of the buffer cache includes increasing the total size of the buffer cache by a user-definable number of additional buffers.

12. The computer program product of claim 8, wherein blocking the thread includes:
   placing a record of the thread in a priority queue, wherein the priority queue is ordered such that threads requiring fewer additional buffers are associated with records that are closer to a head of the priority queue.

13. The computer program product of claim 12, comprising additional functional descriptive material that, when executed by the computer, causes the computer to perform actions of:
   determining if sufficient free buffers exist in the buffer cache to allocate buffers required by a lowest-requirement thread associated with a record at the head of the priority queue; and
   in response to a determination that sufficient free buffers exist in the buffer cache to allocate the buffers required by the lowest-requirement thread, allocating the buffers required by the lowest-requirement thread.

14. The computer program product of claim 8, wherein the computer program product forms a portion of an operating system kernel.

15. A data processing system comprising:
at least one processor;
data storage accessible to the at least one processor; and
a set of instructions in the data storage, wherein the at least one processor executes the set of instructions to perform actions of:
   determining that a thread executing in the data processing system requires an allocation of one or more input/output buffers in a buffer cache residing in the data storage;
   determining if performing the allocation would result in the buffer cache having a number of free buffers that is less than a pre-determined threshold;
   in response to a determination that performing the allocation would result in the buffer cache having a number of free buffers that is less than the pre-determined threshold, increasing a total size of the buffer cache; and
   in response to a determination that performing the allocation would not result in the buffer cache having a number of free buffers that is less than the pre-determined threshold:
      determining if performing the allocation would result in the buffer cache having a number of free buffers that is less than a minimum number of buffers needed to perform the action of increasing the total size of the buffer cache, wherein the predetermined threshold is at least as big as the minimum number;
      in response to a determination that performing the allocation would result in the buffer cache having a number of free buffers that is less than the minimum number of buffers needed to perform the action of increasing the total size of the buffer cache, blocking the thread until the allocation can be performed without the buffer cache having fewer than the minimum number of buffers needed to perform the action of increasing the total size of the buffer cache; and
      in response to a determination that performing the allocation would not result in the buffer cache having a number of free buffers that is less than the minimum number of buffers needed to perform the action of increasing the total size of the buffer cache, performing the allocation.

16. The data processing system of claim 15, wherein said increasing the total size of the buffer cache includes spawning an additional process, wherein the additional process increases the size of the buffer cache.

17. The data processing system of claim 15, wherein the pre-determined threshold is user-definable.

18. The data processing system of claim 15, wherein said increasing the total size of the buffer cache includes increasing the total size of the buffer cache by a user-definable number of additional buffers.

19. The data processing system of claim 15, wherein blocking the thread includes:
   placing a record of the thread in a priority queue, wherein the priority queue is ordered such that threads requiring fewer additional buffers are associated with records that are closer to a head of the priority queue.

20. The data processing system of claim 19, wherein the at least one processor executes the set of instructions to perform additional actions of:
   determining if sufficient free buffers exist in the buffer cache to allocate buffers required by a lowest-requirement thread associated with a record at the head of the priority queue; and
   in response to a determination that sufficient free buffers exist in the buffer cache to allocate the buffers required by the lowest-requirement thread, allocating the buffers required by the lowest-requirement thread.

* * * * *